United States Patent [19]
Wolf

[11] 4,064,607
[45] Dec. 27, 1977

[54] COMPRESSION ROLLER FOR PAPER PRODUCING MACHINERY

[75] Inventor: Robert Wolf, Herbrechtingen, Germany

[73] Assignee: J. M. Voith G.m.b.H., Heidenheim (Brenz), Germany

[21] Appl. No.: 775,222

[22] Filed: Mar. 7, 1977

Related U.S. Application Data

[63] Continuation of Ser. No. 648,770, Jan. 13, 1976, abandoned.

[30] Foreign Application Priority Data

Jan. 21, 1975   Germany ............................. 2502161

[51] Int. Cl.² .......................................... B21B 13/02
[52] U.S. Cl. .............................................. 29/116 AD
[58] Field of Search ....... 29/116 AD, 113 AD, 116 R

[56] References Cited

U.S. PATENT DOCUMENTS

| | | | |
|---|---|---|---|
| 3,624,880 | 12/1971 | Justus et al. | 29/116 AD |
| 3,747,181 | 7/1973 | Nykopp et al. | 29/113 AD |
| 3,802,044 | 4/1974 | Spillman et al. | 29/113 AD |
| 3,833,980 | 9/1974 | Gaghan | 29/116 AD |
| 3,846,883 | 11/1974 | Biondetti | 29/116 AD |

Primary Examiner—Alfred R. Guest
Attorney, Agent, or Firm—Edwin E. Greigg

[57] ABSTRACT

The compression roller in a paper producing machine has a relatively thin outer casing which rotates and is supported directly below the point of contact by a stationary support system. The support system includes an elongated cylinder and piston assembly. Attached to the piston is a pivotable support bar whose surface conforms substantially to the inside surface of the rotating casing. A pump supplies pressurized fluid medium through conduits in the piston to a long channel in the support bar, thus providing a fluid film on which the casing is supported. Side pockets in the support bar are connected to the long channel and serve to stabilize and centralize the position of the support bar.

4 Claims, 3 Drawing Figures

COMPRESSION ROLLER FOR PAPER PRODUCING MACHINERY

This is a continuation of application Ser. No. 648,770, filed Jan. 13, 1976 now abandoned.

BACKGROUND OF THE INVENTION

The invention relates to a compression roller for paper producing machinery intended to deliver a linear pressure to a second cooperating roller. The compression roller includes a rotatable tubular outer casing whose cross section is circular and also includes a non-rotatable roller core. The core includes a cylinder and a rod-like piston, extending over the entire length of the roller, which is radially adjustable. Pivotally adjusted to this piston and urged thereby against the inside of the casing is a support bar which extends substantially over the length of the roller and has an external contour which substantially conforms to the shape of the roller casing.

If the compression rollers were to be employed in normal use without further precaution, they would be bent out of shape and thus would entail faulty treatment of the paper web.

For this reason, there has been developed the so-called floating roller, in which a support bar is pushed against the roller casing from the inside and where a pressure medium is placed between the casing and the support bar so that the casing floats on a hydraulic carrier film. This carrier film is built up by forming a wedge-shaped space at the outside surfaces of the carrier rail, as disclosed in German Offenlegungsschrift 1 461 066.

A disadvantage of this known apparatus is that the hydrodynamic carrier film depends on the rotational speed. When the roller is standing still, the carrier rail and the casing are in metallic contact so that when the machinery is started up, the casing is easily damaged. Furthermore, the direction of rotation is significant in the formation of the film.

OBJECT AND SUMMARY OF THE INVENTION

It is a principal object of the invention to provide paper machinery in which a capable carrier film is provided between the casing of a pressure roller and the corresponding support bar without requiring high power and while eliminating any danger of damage.

This object is attained according to the invention by providing that the external surface of the support bar has a channel extending substantially over its entire length, and by connecting this channel via pressure lines with the pressure chamber formed by the cylinder and piston. The invention further provides that the support bar is equipped with pockets or depressions on both sides of the channel and that these pockets are connected with the channel by capillary conduits.

The apparatus according to the invention provides a support for the roller casing lying precisely beneath the location of external pressure. Thus, any desired bending or deformation characteristic may be substantially achieved.

A further advantage of the invention is that roller tubes of low thickness may be used.

The provision of pockets, on both sides of the channel which supports the casing, results in an automatic centering and equalizing of the relative positions of support bar and casing. This is due to the fact that, if the support bar were to tend to an angular position with relation to one or the other side, the gap between the casing and the appropriate portion of the support bar would increase. For this reason, the pressure at this location would be decreased while it is correspondingly increased at the opposite side, thus initiating an automatic recentering. Inasmuch as the channel communicates directly with the pressure chamber formed by the cylinder and the piston, it is always exposed to positive fluid pressure and a direct metallic contact between the support bar and the roller casing is thus avoided.

German Offenlegungsschrift 2 245 597 also describes a roller with deformation compensation and including pockets in a support bearing and connected with a pressure chamber between a cylinder and a piston. In this case, however, the piston is not a rod-like piston and the support rail is not continuous. Instead, several individual support bearings are distributed over the entire extent of the roller. Furthermore, these pockets are connected with the pressure chamber only via capillary conduits. The resulting pressure losses require a correspondingly high pump pressure so as to produce the necessary carrier film in the pockets.

An advantageous embodiment of the invention provides that several pockets are disposed along the length of the roller. By this means, an excessive pressure medium loss is avoided when the carrier rail is displaced obliquely or when the roller casing is deformed. For, if either of these events were to occur, only that pocket which is located in the appropriate region would be drained.

The invention further provides a pivotable joint between the support bar and piston.

In yet another embodiment of the invention, the support bar is connected with the piston by a bearing bolt.

It is particularly advantageous if the radius of the bearing bolt is approximately 10 percent smaller than the cooperating recess in the support bar. If this construction obtains, there is no sliding friction which would require high forces for overcoming the frictional resistance; instead, the only friction occurring is rolling friction.

Yet another exemplary embodiment of the invention provides that the inside of the support bar has a guide rail whose lateral surfaces, as well as the surface facing the interior of the roller, are convexly shaped and the guide rail cooperates with a recess in the piston. This is a simple but reliable type of bearing.

The invention will be better understood, as well as further objects and advantages thereof become more apparent, from the ensuing detailed specification of preferred embodiments taken in conjunction with the drawing.

DESCRIPTION OF THE PREFERRED EMBODIMENTS

Figure 1:
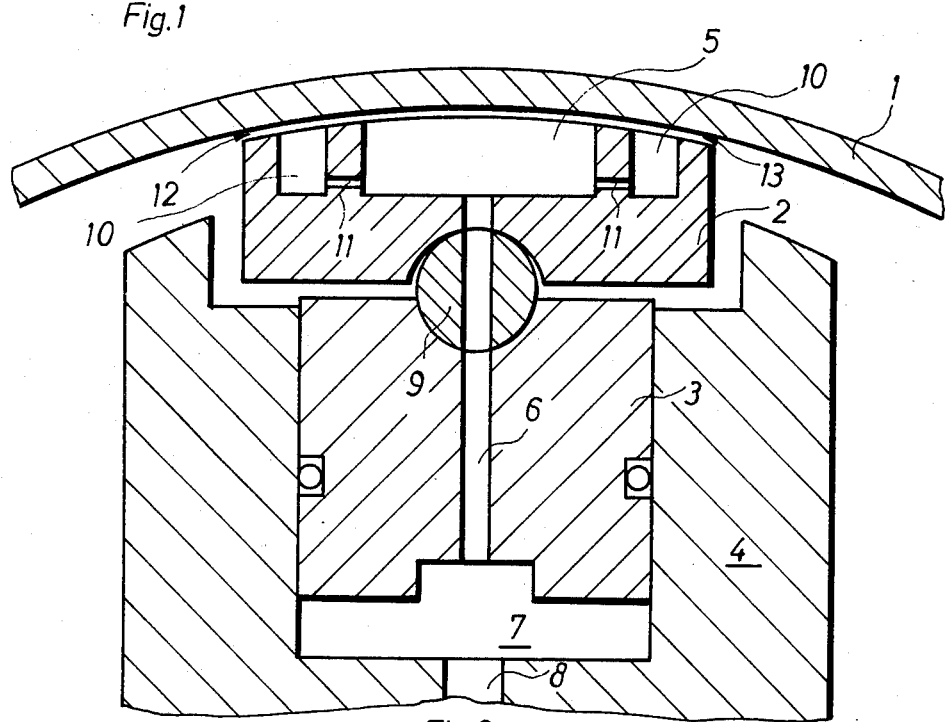
FIG. 1 is a cross section of a roller, including a section of the apparatus according to the invention.

Turning now to FIG. 1, there is shown a section of a compression roller including a hollow, cylindrical, rotatable casing 1 which is supported directly underneath the pinch line by a support bar 2 extending over the entire length. In order to supply this support, the support bar 2 is pressed against the interior of the casing by a rod-like piston 3 which glides within a cylinder 4. The support bar 2 has a channel 5 which is connected by a plurality of pressure lines 6 distributed along the rod-like piston 3 with the pressure chamber 7, which is formed by cooperation of the piston and the cylinder 4. A primary pressure line 8 supplies pressurized fluid to the pressure chamber 7 and, hence, also to the channel 5. Accordingly, a carrier film is formed in and about the channel 5 and the casing "floats" on this carrier film. A bearing bolt 9 is provided for permitting pivotable support of the support bearing 2 on the piston 3; the pressure lines 6 also pass through this bearing bolt 9. In order to ensure the centering or balancing of the support bar, the support bar 2 includes a plurality of pockets, or recesses 10 which are disposed alongside of the channel 5 and are all connected to the channel 5 through capillary conduits 11.

In operation, if one of the two gaps 12 or 13 formed between the support bar 2 and the casing 1 is increased at any point of the roller, then the pressure medium emerges from the associated pocket 10 to a greater degree than elsewhere. The process has already been explained above: the higher pressure prevailing in surrounding pockets tends to make the support bar reassume its original balanced and correct position.

The support bar 2 includes a semicircular recess for supporting the bearing bolt 9 and, advantageously, this recess has a diameter which is approximately 10 percent larger than the diameter of the bearing bolt. Under these conditions, there is only line contact between the two elements and friction is confined to rolling friction, requiring substantially lower adjustment forces than would sliding friction, which is entirely avoided.

If necessary, a sealing ring may be placed between the bearing bolt 9 and the support bar so as to prevent the emergence of pressure fluid medium from the lines 6. In most cases, however, the very high pressure prevailing between the bearing bolt and the support bar and the relatively narrow gap between them would make such a sealing ring unnecessary.

Figure 2:
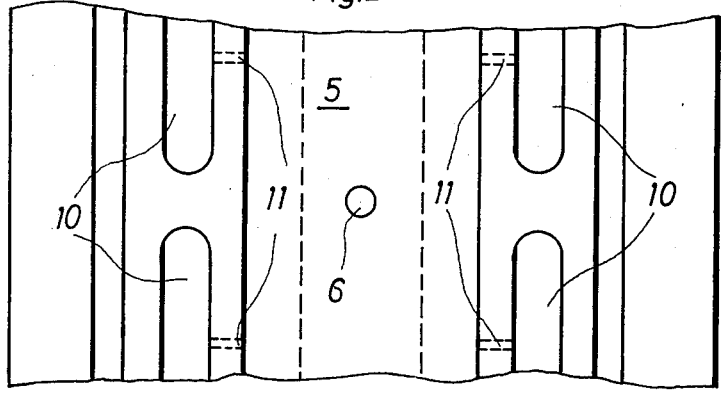
FIG. 2 is a top view of the apparatus according to the invention.
Figure 3:
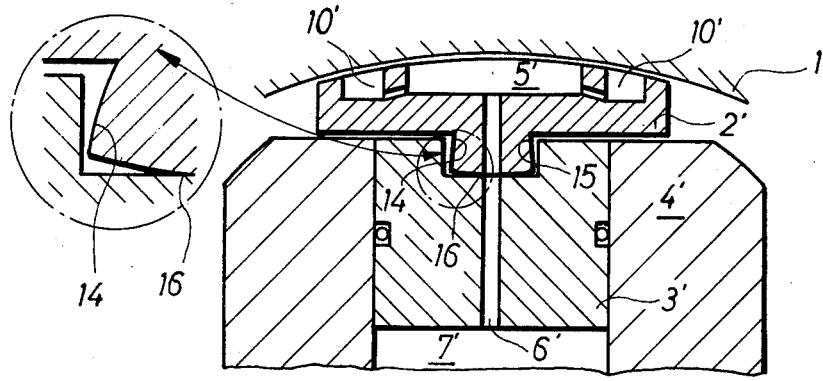
FIG. 3 is a sectional side view of a second embodiment of portions of the invention.

FIG. 3 depicts a variant embodiment of the invention of substantially the same construction as that described in FIGS. 1 and 2. The pivotable bearing of the support bar 2' is different in this embodiment. The support bar 2' has an extension acting as a guide rail. The two lateral surfaces 14 and 15, as well as the surface 16 facing the interior of the roller, are all convex. Thus, the support bar 2' rolls in a recess within the piston 3'.

What is claimed is:

1. A compression roller, comprising:
   A. a casing defined by a hollow, rotatable, substantially circular cylinder;
   B. stationary support means, disposed within said casing and including:
      i. cylinder means, with an internal void;
      ii. piston means, partially and slidably disposed within said internal void of said cylinder means and forming therewith a pressure chamber and extending substantially over the entire length of said casing; and
      iii. a support bar, carried pivotably on said piston means and extending substantially over the entire length of said casing, having an external contour substantially conforming to the inside contour of said casing, and urged by said piston under pressure against said casing, the improvement comprising said support bar being provided with a longitudinal channel-like recess in said external contour, said channel extending substantially along the entire length of said casing, said support bar and said piston also including pressure conduits, for providing substantially unrestricted fluid communication between said channel and said pressure chamber; said support bar being further provided with a plurality of recess-like pockets arranged seriatim over the entire length of said support bar and disposed in the external surface thereof on both lateral sides of said channel, and with capillary channels for providing fluid communication between said channel and each of said pockets.

2. A compression roller as defined in claim 1, wherein said support bar further includes a longitudinal recess and said support means further includes a bearing rod disposed longitudinally in said recess for providing bearing action between said piston and said support bar.

3. A compression roller as defined in claim 2, wherein said recess is of circular cross section and the radius of said cross section is substantially larger than the radius of said bearing rod; thereby preventing surface contact.

4. A compression roller as defined in claim 1, wherein said support bar is extended on the side adjacent said piston to form a longitudinal guide rail having three lateral surfaces of convex curvature and wherein said piston is provided with a channel-like recess in which said guide rail is located for guidance and support of said support rail.

* * * * *